T. D. KELLY.
CONSTRUCTION OF PACKING FOR PISTON RINGS.
APPLICATION FILED OCT. 4, 1918.

1,354,404. Patented Sept. 28, 1920.

Witnesses:
C. A. Rowe

Inventor
Thomas D. Kelly
by James L. Norris
Attorney

UNITED STATES PATENT OFFICE.

THOMAS DANIEL KELLY, OF HOVE, ENGLAND.

CONSTRUCTION OF PACKING FOR PISTON RINGS.

1,354,404.  Specification of Letters Patent.  Patented Sept. 28, 1920.

Application filed October 4, 1918. Serial No. 256,833.

*To all whom it may concern:*

Be it known that I, THOMAS DANIEL KELLY, a subject of the King of Great Britain, residing at Hove, Sussex, England, have invented certain new and useful Improvements in Construction for Packing or Piston Rings, of which the following is a specification.

An improved packing ring is made by forming a screw thread on the inside of ordinary type spring rings which thread fits a similar thread cut on the outside of the moving piston or stationary head thus making contact at all points inside and outside and effectually preventing leakage at the back of the joint. In rings of the obturator type the thread takes the place of the locking ring now used the thread being formed underneath the L on the inside bottom portion, the flange of the L forming a flange which makes a tight joint with the top portion of the piston owing to being screwed down upon it. For use in stuffing boxes or in cylinder walls with a piston or piston rod passing through, a male thread is cut on the split choke ring springing inward this thread fitting into a female thread in the wall or stuffing box. In the stuffiing box arrangement this type of choke ring may have a flange making a joint with the cylinder cover. The rings may be split or slotted in any way suitable.

The main object of this invention is to prevent leakage at the back of packing rings the screw threads making a series of angular or horizontal joints preventing such leakage. There is no need to stretch or strain the rings when putting in position as with the ordinary type, as they screw into position and in addition to being gas and air tight prevent oil passing although oil is carried with the piston in the threads underneath the rings. In steam engines and hydraulic pumps asbestos or like packing may be placed between two such rings.

The annexed drawings illustrate several examples of carrying my invention into effect.

Figure 1 is a part sectional elevation of a trunk piston in which the piston rings A are provided with a female thread and are screwed on to a male thread formed on a recessed portion B of the piston C.

In this case I show two piston rings A at a distance apart and the spaces between may be filled in with a packing material which by a screwing of the packing rings may be tightened to further fit the cylinder walls and insure a tighter joint.

Figure 1:
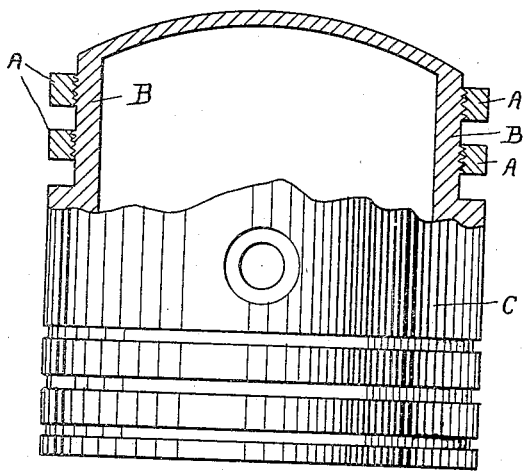
Figure 4:
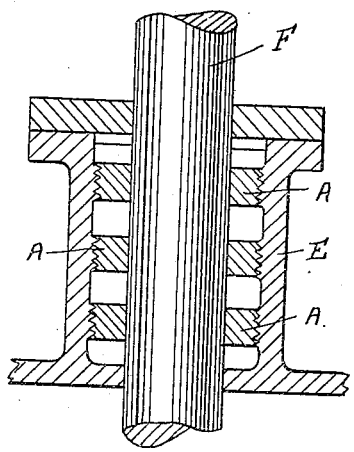
Fig. 4 is a section of a stuffing box E in which three packing rings are provided with male screw threads engaging female screw threads formed on the inside wall of the stuffing box E the spaces between being preferably filled with a suitable packing for insuring a better joint with the reciprocating rod F.
Figure 2:
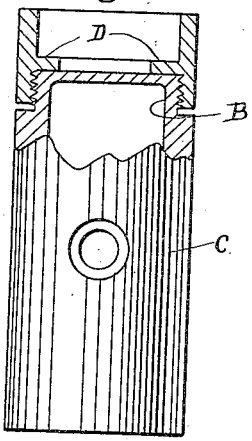
Fig. 2 is a part sectional elevation of a trunk piston C and showing a ring of the obturator type applied the flange on bottom portion being provided with a female screw thread engaging a male thread on a recessed portion B of the piston C the flange D engaging the top of the piston C to make a tight joint.
Figure 3:
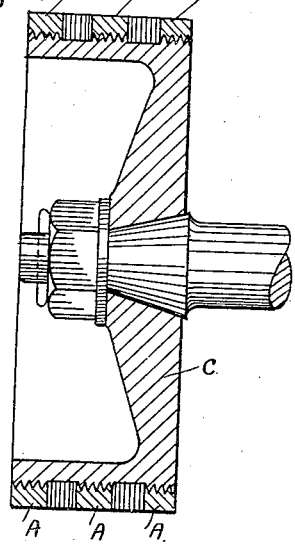
Fig. 3 is a section of an ordinary piston C showing three packing rings A provided with female screw threads engaging male threads on the outside surface of the piston C the spaces between the rings A being left blank or filled up with suitable packing as referred to with reference to Fig. 1.

What I do claim as my invention, and desire to secure by Letters Patent, is:—

A metallic packing ring for relatively movable members, comprising a split ring screw-threaded to one of said members and having a bearing surface with the other of said members.

In testimony whereof I have hereunto set my hand in presence of two subscribing witnesses.

THOMAS DANIEL KELLY.

Witnesses:
RICHARD CORE GARDNER,
JESSIE MORGAN.